(12) United States Patent
Fields et al.

(10) Patent No.: US 6,412,008 B1
(45) Date of Patent: Jun. 25, 2002

(54) SYSTEM AND METHOD FOR COOPERATIVE CLIENT/SERVER CUSTOMIZATION OF WEB PAGES

(75) Inventors: Duane Kimbell Fields, Austin; Thomas Preston Gregg, Round Rock; Sebastian Daniel Hassinger, Blanco; William Walter Hurley, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/239,250

(22) Filed: Jan. 28, 1999

(51) Int. Cl.[7] ................................................ G06F 15/16
(52) U.S. Cl. ...................... 709/228; 709/205; 709/217; 709/219; 709/229; 709/232; 709/235; 710/104; 713/1; 713/100
(58) Field of Search ................................ 709/203, 205, 709/217, 219, 228, 229, 232, 235, 220; 710/104; 713/1, 100

(56) References Cited

U.S. PATENT DOCUMENTS

| | | | | |
|---|---|---|---|---|
| 5,740,430 A | * | 4/1998 | Rosenberg et al. | 707/200 |
| 5,802,530 A | * | 9/1998 | Hoff | 707/513 |
| 5,848,396 A | * | 12/1998 | Gerace | 705/10 |
| 5,867,153 A | * | 2/1999 | Grancolas et al. | 345/326 |
| 5,867,651 A | * | 2/1999 | Dan et al. | 709/203 |
| 5,918,013 A | * | 6/1999 | Mighdoll et al. | 709/217 |
| 5,944,790 A | * | 8/1999 | Levy | 709/218 |
| 5,960,432 A | * | 9/1999 | Werner | 707/10 |
| 6,026,237 A | * | 2/2000 | Berry et al. | 395/704 |
| 6,049,821 A | * | 4/2000 | Theriault et al. | 709/203 |
| 6,049,831 A | * | 4/2000 | Gardell et al. | 709/236 |
| 6,112,192 A | * | 8/2000 | Capek | 705/59 |
| 6,122,657 A | * | 9/2000 | Hoffman, Jr. et al. | 709/201 |
| 6,122,658 A | * | 9/2000 | Chaddha | 709/203 |
| 6,161,112 A | * | 12/2000 | Cragun et al. | 707/501 |
| 6,161,126 A | * | 12/2000 | Wies et al. | 709/203 |
| 6,167,441 A | * | 12/2000 | Himmel | 709/217 |
| 6,247,048 B1 | * | 6/2001 | Greer et al. | 709/219 |
| 6,263,346 B1 | * | 7/2001 | Rodriguez | 707/201 |

* cited by examiner

Primary Examiner—Saleh Najjar
(74) Attorney, Agent, or Firm—Leslie A. Van Leeuwen (57) ABSTRACT

A system, method, and computer-usable medium for customizing and displaying a network file distributes customization tasks between a client and a server. A client sends a request for a network file, such as a Web page, to a server. The request may include information regarding the client machine type, browser, and customization options (i.e. preferences). Customization options may include personal (i.e. user) options and group (i.e. department, corporate, etc.) options. These options, along with the client machine type and browser, are used by the server to determine how to customize the requested network file. The server obtains the requested network file, and a server-side customization program customizes the file. The server-side customization program may also analyze the network file, and may embed return customization information in the customized network file. The client receives the customized network file, including the return customization information, from the server. A client-side customization program then performs further customization on the network file. This customization may be based on the return customization information from the server, other user preferences known by the client, and/or current conditions at the client. After the client-side customization is complete, the final customized file is displayed by the client.

24 Claims, 13 Drawing Sheets

SYSTEM AND METHOD FOR COOPERATIVE CLIENT/SERVER CUSTOMIZATION OF WEB PAGES

FIELD OF THE INVENTION

The present invention relates to the field of information handling-systems, and, more particularly, to a system and method for customizing and displaying Web pages by utilizing cooperation and distribution of tasks between a client and a server.

BACKGROUND OF THE INVENTION

In network computer systems, a plurality of client computers are typically connected together, and to one or more server computers in the network. A network may be established through the hardwired interconnection of a plurality of clients and servers in a local network, or on a wider scale such as an intranet, or the Internet or World Wide Web, which may include telecommunication links. In any case, the clients and servers may act as central control units for providing access to files, programs, and program execution to the individual computers connected within the network.

The World Wide Web is the Internet's multimedia information retrieval system. In the Web environment, client machines effect transactions to Web servers using the Hypertext Transfer Protocol (HTTP), which is an application protocol providing users access to files (e.g., text, graphics, images, animation, sound, video, etc.) using a standard page description language known as Hypertext Markup Language (HTML). HTML provides basic document formatting and allows a developer to specify "links" to other servers and files. In the Internet paradigm, a network path to a server is identified by a Uniform Resource Locator (URL) having a specified syntax for defining a network connection. Use of an HTML-compatible browser (e.g., Netscape Navigator or Microsoft Internet Explorer) at a client machine involves specification of a link via the URL. In response, the client makes a request to the server identified in the link and receives in return a document formatted according to HTML.

Many different browser applications are available for use in viewing Web pages from client machines. Examples of currently available browsers include Netscape Navigator and Microsoft Internet Explorer. In addition, many different types of client machines are used, or have been proposed for use, to provide access to intranets, the Internet, and other networks. Examples of currently used client machines include desktop computers, portable or notebook computers, hand-held or palmtop computers, Personal Digital Assistants (PDAs), and other types of Web appliances. For example, a data processing system may be connected to a television set and used in lieu of a personal computer to provide Web access through a conventional remote control device associated with the system unit. Such a system enables the television to become, in effect, a "Web appliance." The viewer can rapidly switch between conventional television and Internet access using the remote control unit. All of the conventional Internet access tools and navigational functions are preferably built in to the system and thus hidden to the user. Other types of client machines may be available in the near future.

Web page authors design their Web content using standard design constraints and HTML formatting constructs. Nevertheless, it is quite often the case that a given Web page looks different when viewed using different browsers and/or on different client machines, e.g., a personal computer running Netscape Navigator versus a palmtop computer using a custom browser designed for the particular palmtop computer. Web designers may design multiple versions of the same or similar content in order to attempt to maintain consistent Web page display across different browser types and client machines. However, it would be an insurmountable task to design a version of a Web page for every possible client machine/browser combination. Furthermore, multiple Web page versions must then be supported on a given server, resulting in slower page access time and redundant or wasted Web site storage capacity.

In addition to the problems associated with multiple browser types, and the ever-increasing number of client machine types, it is often the case that an individual client wishes to view a Web page in a particular way. For example, a visually impaired user may desire to receive Web pages without multimedia elements, so that a text reader can more easily read the content to him. A user may even wish to view Web pages in different ways at different times. For example, if the user is in a hurry, he may wish to view Web pages without any graphics images, whereas if the user has more time, he may wish to view Web pages with all bandwidth intensive objects. Lighter weight clients, such as PDAS, have less processing power, and therefore may have difficulty rendering processor-intensive objects. Other constraints may include bandwidth limitations or cost, or security concerns regarding embedded executable code, such as Java or ActiveX.

Consequently, it would be desirable to have a system and method for customizing a network file for display on a client machine. It would also be desirable to customize the file based on multiple factors, such as browser type, client machine type, current conditions, user preferences, corporate requirements, etc. It would further be desirable to perform the customization in the most efficient manner possible.

SUMMARY OF THE INVENTION

Accordingly, the present invention is directed to a system, method, and computer-usable medium for customizing and displaying a network file by distributing customization tasks between a client and a server. The network file, such as a Web page, is customized based on multiple factors, such as browser type, client machine type, current conditions, user preferences, and corporate requirements.

A client sends a request for a network file, such as a Web page, to a server. The request may include information regarding the client machine type, browser, and customization options (i.e. preferences). Customization options may include personal (i.e. user) options and group (i.e. department, corporate, etc.) options. These options, along with the client machine type and browser, are used by the server to determine how to customize the requested network file. The server obtains the requested network file, and a server-side customization program customizes the file. The server-side customization program may also analyze the network file, and may embed return customization information in the customized network file. The client receives the customized network file, including the return customization information, from the server. A client-side customization program then performs further customization on the network file. This customization may be based on the return customization information from the server, other user preferences known by the client, and/or current conditions at the client. After the client-side customization is complete, the final customized file is displayed by the client.

An advantage of the present invention is that the customization of a network file, such as a Web page, is accomplished via shared, interactive customization between the client and the server. This approach utilizes the advantages of both client-side customization and server-side customization. Another advantage of the present invention is that network files may be customized based on multiple factors. A further advantage of the present invention is. that customization is performed in an efficient manner.

BRIEF DESCRIPTION OF THE DRAWINGS

The foregoing and other features and advantages of the present invention will become more apparent from the detailed description of the best mode for carrying out the invention as rendered below. In the description to follow, reference will be made to the accompanying drawings, where like reference numerals are used to identify like parts in the various views and in which.

DETAILED DESCRIPTION OF A PREFERRED EMBODIMENT OF THE INVENTION

Figure 1:
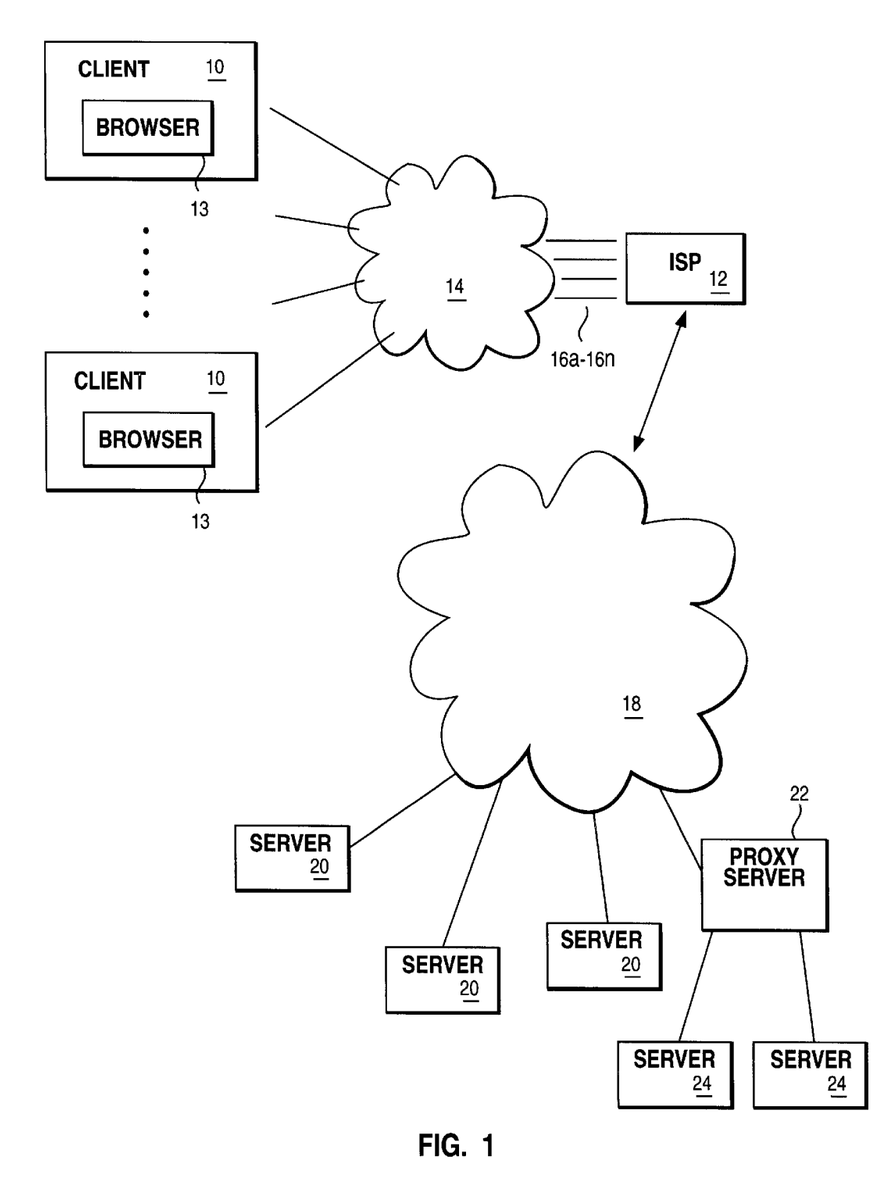
FIG. 1 is a representative system in which the present invention may be implemented.

A representative system in which the present invention may be implemented is illustrated in FIG. 1. A plurality of Internet client machines 10 are connectable to a computer network Internet Service Provider (ISP) 12 via a network, such as dialup telephone network 14. As is known, the dialup telephone network usually has a given, limited number of connections 16a–16n. ISP 12 interfaces client machines 10 to the remainder of network 18, which includes a plurality of server machines 20. In some cases, a proxy server 22 serves as an intermediary or request broker between client machines 10 and servers 24. Proxy server 22 may be located at a particular Web site (as shown) or may be a dedicated server (e.g., a server located at ISP 12). A client machine typically includes a suite of known Internet tools, including Web browser 13, to access the servers of the network and thus obtain certain services. These services include one-to-one messaging (e-mail), one-to-many messaging (bulletin board), on-line chat, file transfer and browsing. Various known Internet protocols are used for these services. Thus, for example, browsing is effected using the Hypertext Transfer Protocol (HTTP), which provides users access to multimedia files using Hypertext Markup Language (HTML). The collections of servers that use HTTP comprise the World Wide Web, which is the Internet's multimedia information retrieval system.

Figure 2:
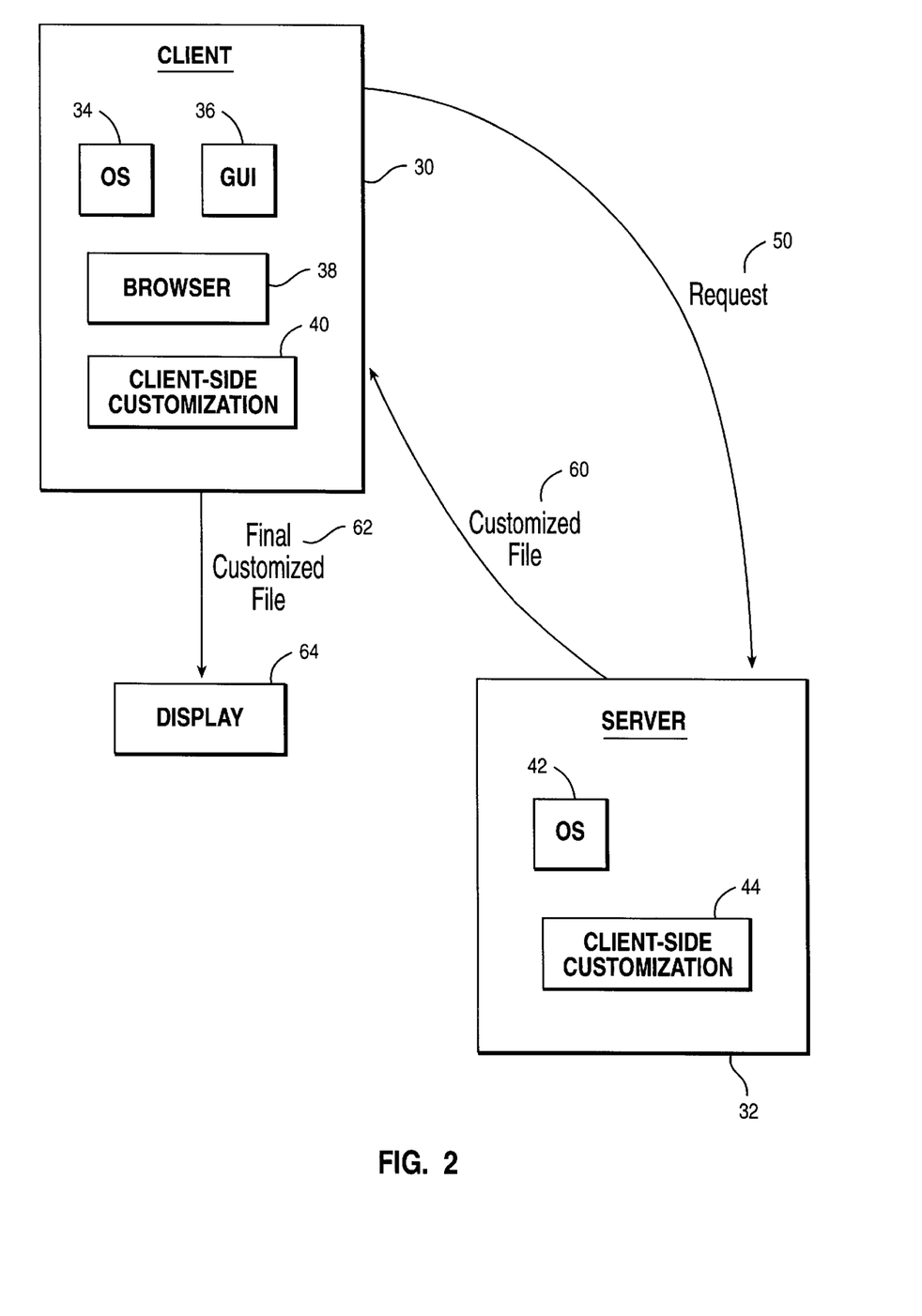
FIG. 2 is a block diagram showing selected elements of a representative client and server.

As shown in FIG. 2, the invention is a method and system for customizing a network file, such as a Web page, for viewing by a user. Customization of the network file is achieved by distributing the customization tasks between requesting client 30 and server 32. Note that only selected components of requesting client 30 and server 32 are shown in FIG. 2. Requesting client 30 typically includes operating system (OS) 34, graphical user interface (GUI) 36, browser 38, and client-side customization program 40. Server 32 typically includes operating system 42 and server-side customization program 44. Server 32 may also be implemented as a proxy server, as discussed above with reference to FIG. 1, in which case the proxy server would include server-side customization program 44.

Client 30 may be a personal computer, such as a desktop, notebook, palmtop or hand-held computer. It may be a mainframe computer, mini computer, or workstation. Client 30 may also be a kiosk, a Web appliance, or a printer. Server 32 may reside on any type of computer system, including, but not limited to a mainframe computer, mini computer, workstation, or personal computer. As used herein, the term "client" should be broadly construed to mean any computer or component thereof directly or indirectly connected or connectable in any known or later-developed manner to a computer network, such as the Internet. The term "server" should also be broadly construed to mean a computer, computer platform, an adjunct to a computer or platform, or any component thereof. Of course, a "client" should be broadly construed to mean one who requests or gets a file, and a "server" is the entity which downloads the file.

There are many cases where customization of a network file is desirable. Often, a given Web page looks different depending on the client machine and/or the browser being used by the client machine. For example, a given Web page may look different when viewed on a workstation versus a palmtop computer, due to the difference in screen size between the two types of computers. A particular Web page may look different when viewed on a personal computer versus a Web appliance, due to differences in color, contrast, or brightness.

Other types of customization may also be desirable. A particular user may wish to view network files in a certain way. The user may prefer black and white images, rather than color images, or may prefer a larger font size. A group of users, such as a department or company, may also prefer to view network files in a certain way. These preferences may change based on time of day, network traffic, or other factors, such as memory or storage resources, media formats, or traffic prioritization.

Figure 3A:
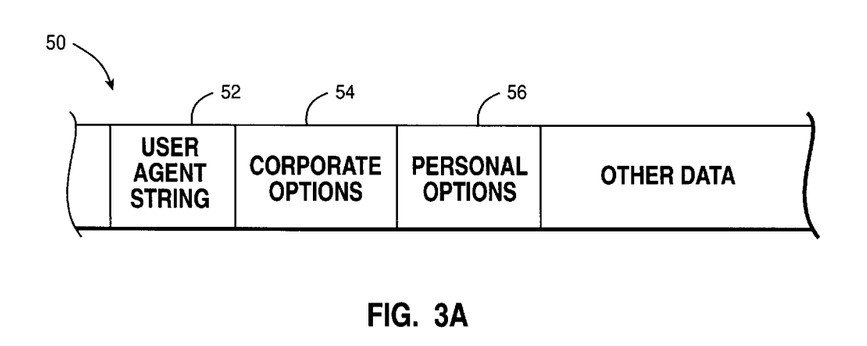
FIGS. 3A is a simplified block diagram of a client request for a customized file.

Still referring to FIG. 2, client 30 sends request 50 for a network file, such as a Web page, to server 32. Request 50 preferably includes customization requests from client 30. One skilled in the art will realize that there are many ways in which request 50 may be implemented. For example, as shown in FIG. 3A, client preferences may be included as part of an HTTP header. FIG. 3A depicts a portion of an HTTP header. An HTTP header includes user agent string 52, which typically includes the Internet address (i.e. IP address), platform, browser, and browser revision number of the requesting client. In addition, the HTTP header shown in FIG. 3A includes corporate options 54 and personal options 56. These options tell the server how to customize the requested network file.

Figure 3B:
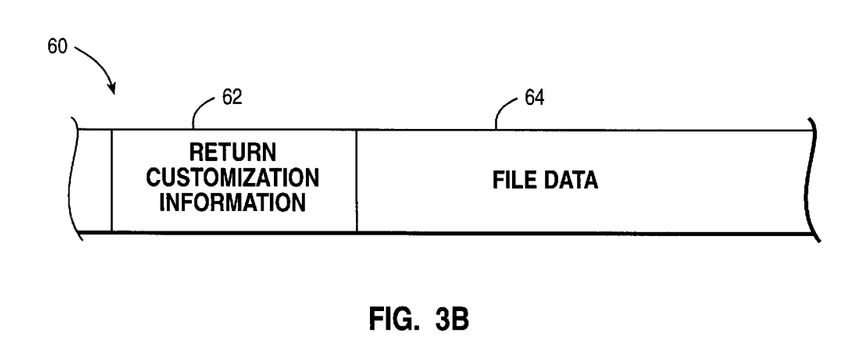
FIGS. 3B and 3C are simplified block diagrams of customized network files, including return customization information.
Figure 3C:
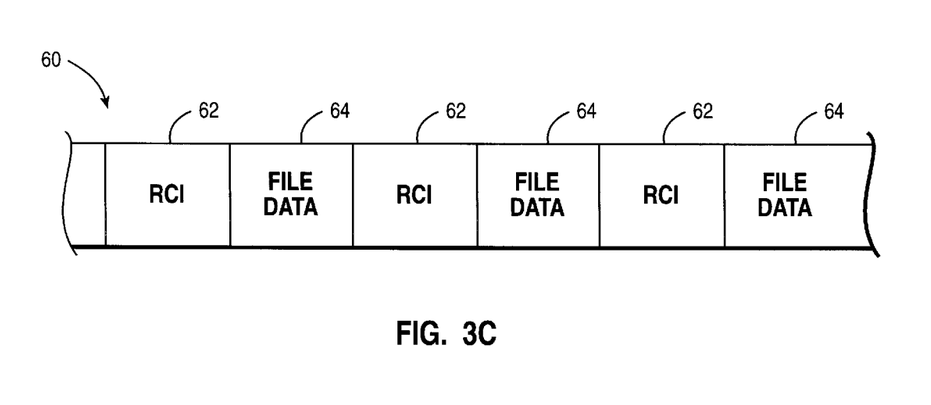

Referring again to FIG. 2, server 32 obtains the requested network file, and server-side customization program 44 customizes the file according to the user agent string, the corporate options, and the personal options. Server-side customization program 44 also analyzes the network file, and may embed return customization information in customized file 60, as shown in FIGS. 3B and 3C. Return customization information 62 may be stored before file data 64 (as shown in FIG. 3B), or return customization information 62 may be embedded at various points in file data 64 (as shown in FIG. 3C).

Referring back to FIG. 2, client 30 receives the customized network file, including return customization information, from server 32. Client-side customization program 40 then performs further customization on the file. This customization may be based on the return customization information in customized file 60, other user preferences known by client 30, and/or current conditions at client 30. After client-side customization is complete, final customized file 62 is displayed on display device 64.

This shared, interactive customization between the client and the server utilizes the advantages of both client-side customization and server-side customization. Often, the server has more memory and a higher processing speed, while the client is a somewhat "lighter weight" machine. Thus it is advantageous to perform large, memory-intensive, transformative types of customization at the server. On the other hand, it is often advantageous to perform customization based on current conditions at the client. User preferences for certain types of customization may change often, and so it may be advantageous to perform the customization for these preferences at the client. Further, there may be some types of customization that are not requested very often, and thus not available on the server. These customization requests may also be performed at the client. Other types of customization of content may take place after the page is received and rendered, and these actions would obviously take place on the client.

Figure 4:
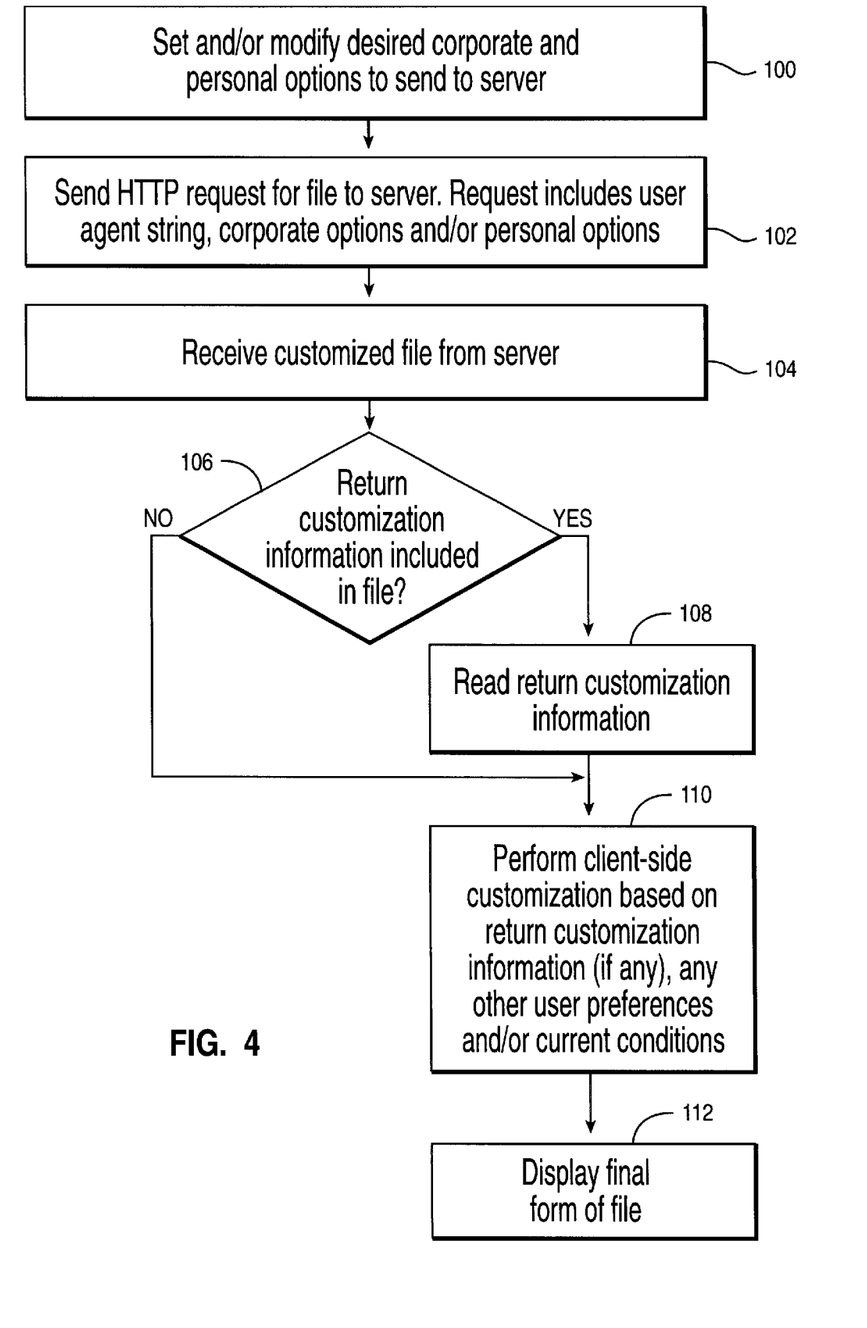
FIGS. 4 and 5 are flow charts depicting a preferred method of the present invention, where customization is performed on both the server side and the client side.
Figure 5:
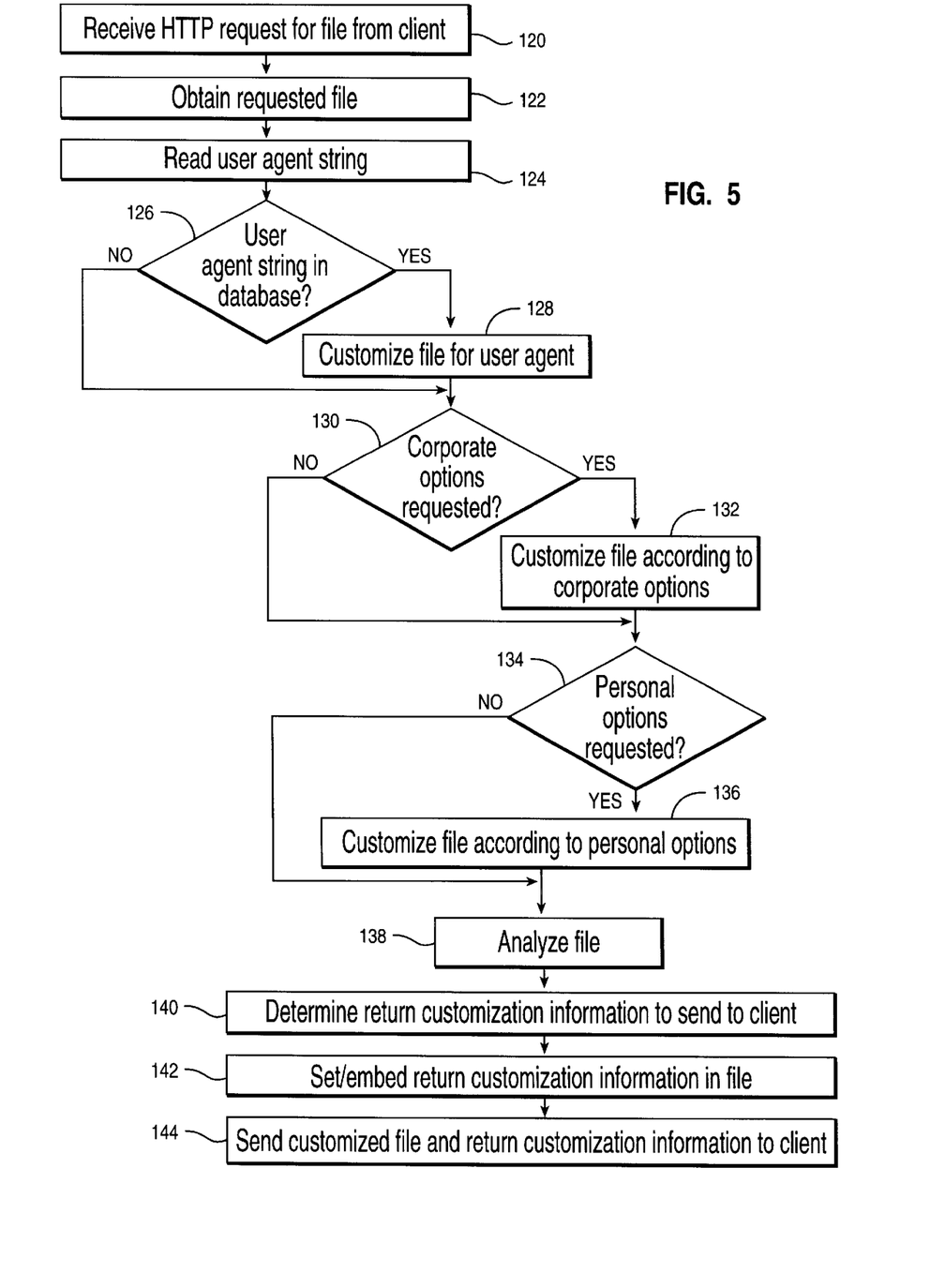

FIGS. 4 and 5 are flow charts depicting a method for customizing a requested network file. FIG. 4 illustrates the steps taken by a client, while FIG. 5 illustrates the steps taken by a server.

Referring now to FIG. 4, the client side of the process will be described. The client sets and/or modifies the desired corporate and personal options to be sent to the server (step 100). One skilled in the art will realize that there are many ways in which the corporate and personal options may be determined and set. For example, corporate options may be set by a system administrator, or included in the browser as it is distributed to various clients. Typically, individual users are not able to change corporate options. Corporate options may have to do with security, system performance, screening, etc. Corporate options may be dynamically changed depending on current conditions. Examples of some possible corporate options are listed below. Of course, the following list is not meant to be inclusive, and is merely provided to illustrate the wide range of corporate options available:

EXAMPLE CORPORATE OPTIONS

1. An option may be set to eliminate all graphics or other multimedia elements from a Web page during certain hours of the day.
2. An option may be set to indicate a security level of the user. Based on the security level, an appropriate version of the requested Web page is provided by the server.
3. An option may be set to eliminate executable content, such as Java or ActiveX, or redirect it through a security screening device.

Personal options may be set by a user via a graphical user interface, such as a pull-down menu, or via a Web page that saves a cookie with the personal options on the client's hard drive. Examples of some possible personal options are listed below. As noted above, the following list is not meant to be inclusive, and merely illustrates the wide range of personal options available:

EXAMPLE PERSONAL OPTIONS

1. An option may be set to request a Web page in an alternate language, or to request that the Web page be translated into another language.
2. An option may be set to request a particular font or type size.
3. An option may be set to delete some or all of the graphics images or other multimedia elements on a Web page.
4. An option may be set to unroll or rearrange tables.
5. An option may be set to return a Web page as a list of links only.
6. An option may be set to color-code search terms for visibility (i.e. the Web page is being retrieved because it was a search engine result, and the user wishes the search terms to be highlighted on the resulting page).
7. An option may be set to crop images to a specific size, and display them with links to view the rest of the image.
8. An option may be set to format a file to a specific page width or length.

Referring again to FIG. 4, the client then sends an HTTP request to a server (step 102). The HTTP request includes the user agent string, the corporate options, and the personal options. The client then waits to receive the requested file from the server (step 104). The file that is received has been customized or modified according to the user agent string, and the requested corporate and personal options.

Next, the client checks to see if there is return customization information included in the returned file (step 106). If so, the client reads the return customization information (step 108). The client then performs further customization based on the return customization information, along with any other known user preferences and/or current conditions (step 110).

There are many types of client-side customization that may be performed at this point. For example, the server may embed complexity information before various portions of the returned file. The complexity information for a particular portion of the returned file indicates the relative complexity of that particular part of the file. For example, a complexity index may be used, where a larger index indicates more complex data. Images are rated as index level one, large images as index level two, dynamic HTML (DHTML) and JavaScript as index level three, Java as index level four, plug-ins as index level five, and so on. The client then decides whether or not to display a particular portion of the file based on its complexity level. This decision may also be based on time of day, e.g., complexity indexes above a certain level can not be displayed between 9 a.m. and 5 p.m. Alternately, the client may allow the user to determine which portions of the file to display based on a performance button or slider (as shown below, with reference to FIGS. 8 through 11). After the client-side customization is complete, the final form of the file is displayed (step 112).

Referring now to FIG. 5, the server side of the process will be described. The server receives an HTTP request from the client (step 120), and obtains the requested network file (step 122). The server reads the user agent string (step 124), and checks to see if the user agent string is in its database (step 126). As discussed above, with reference to FIG. 3A, the user agent string typically includes the Internet address (i.e. IP address), platform, browser, and browser revision number of the requesting client. The server maintains a list, or database, of known user agent strings, along with customization data corresponding to each user agent string. If the user agent string is found in the server's database (i.e. the answer to the question in step 126 is "yes"), the requested Web page is customized for the particular user agent (step 128). For example, if the user agent string is from a particular brand of palmtop computer, the customization data will include the display size of the computer. The server can then eliminate graphics that are wider than the display size, and modify table widths in order to fit them on the screen.

The server next checks to see if any corporate options have bee set (step 130). If so, the file is customized according to the requested corporate options (step 132). Then, the server checks to see if any personal options have been set (step 134), and, if so, the file is customized according to the requested personal options (step 136).

The file is then analyzed (step 138), and the server determines the return customization information to send to the client (step 140). This return customization information is set or embedded in the file (as discussed above with reference to FIGS. 3B and 3C) (step 142), and the customized file, along with the return customization information, is sent to the client (step 144).

FIGS. 6 through 11 depict several examples of the present invention. These examples are shown for illustrative purposes only, and are not meant to be limiting. Their purpose is to illustrate the many and varied uses of the present invention.

Figure 6:
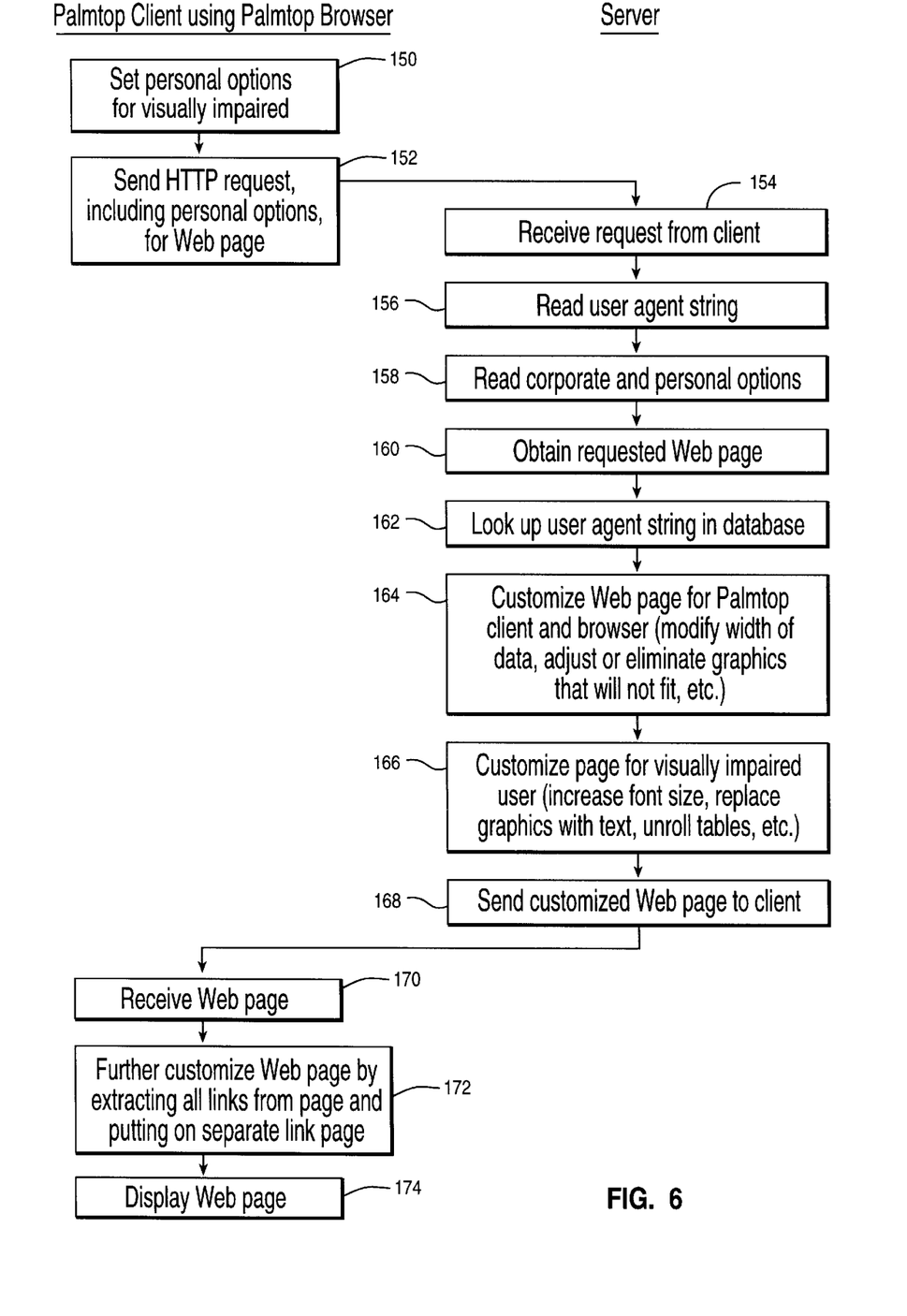
FIGS. 6, 7A, 7B, and 8 are illustrative examples depicting methods for customizing network files in accordance with the present invention.

Referring now to FIG. 6, an example is shown where the client is a palmtop client using a browser specifically designed for the palmtop computer. In this example, the client sets a personal option indicating that the user is visually impaired (step 150). The client then sends an HTTP request for a Web page to the server (step 152). The server receives the request from the client (step 154), and reads the user agent string (step 156), corporate options (of which none are set in this example), and personal options (step 158). The server obtains the requested Web page (step 160). Next, the server looks up the requesting user agent string in its database (step 162). Based on the customization data found in the database, the server customizes the Web page for the palmtop computer by modifying the width of some Web page content and eliminating graphics images that are too wide for the palmtop's display screen (step 164). The server further modifies the Web page for use by a visually impaired user, as requested by the personal options (step 166). These modifications may include increasing the font size, replacing any remaining graphics images with text, and unrolling tables so that they are easier for a reader device to understand (step 166).

The server then sends the customized Web page to the client (step 168). The client receives the Web page (step 170). Note that in this example, no return customization information has been sent by the server. However, the client further modifies the requested Web page based on a user preference (step 172). In this particular example, the user has indicated that all links should be extracted from the Web page and put on a separate link page. One skilled in the art will realize that user preferences may be set in many ways, such as a user preference file, a checklist, etc. The final form of the Web page, having been customized by both the server and the client, is then displayed (step 174).

Figure 7A:
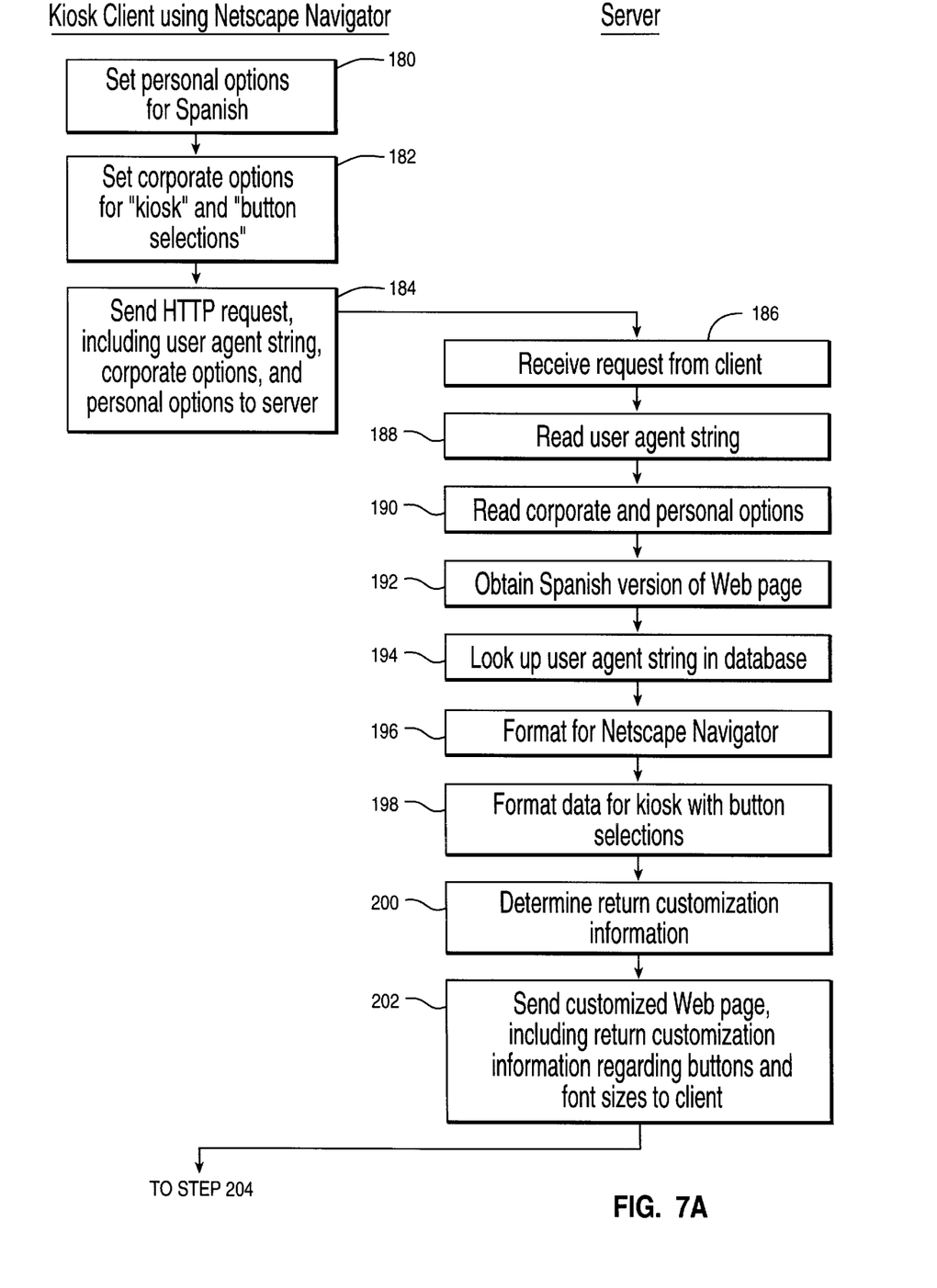
Figure 7B:
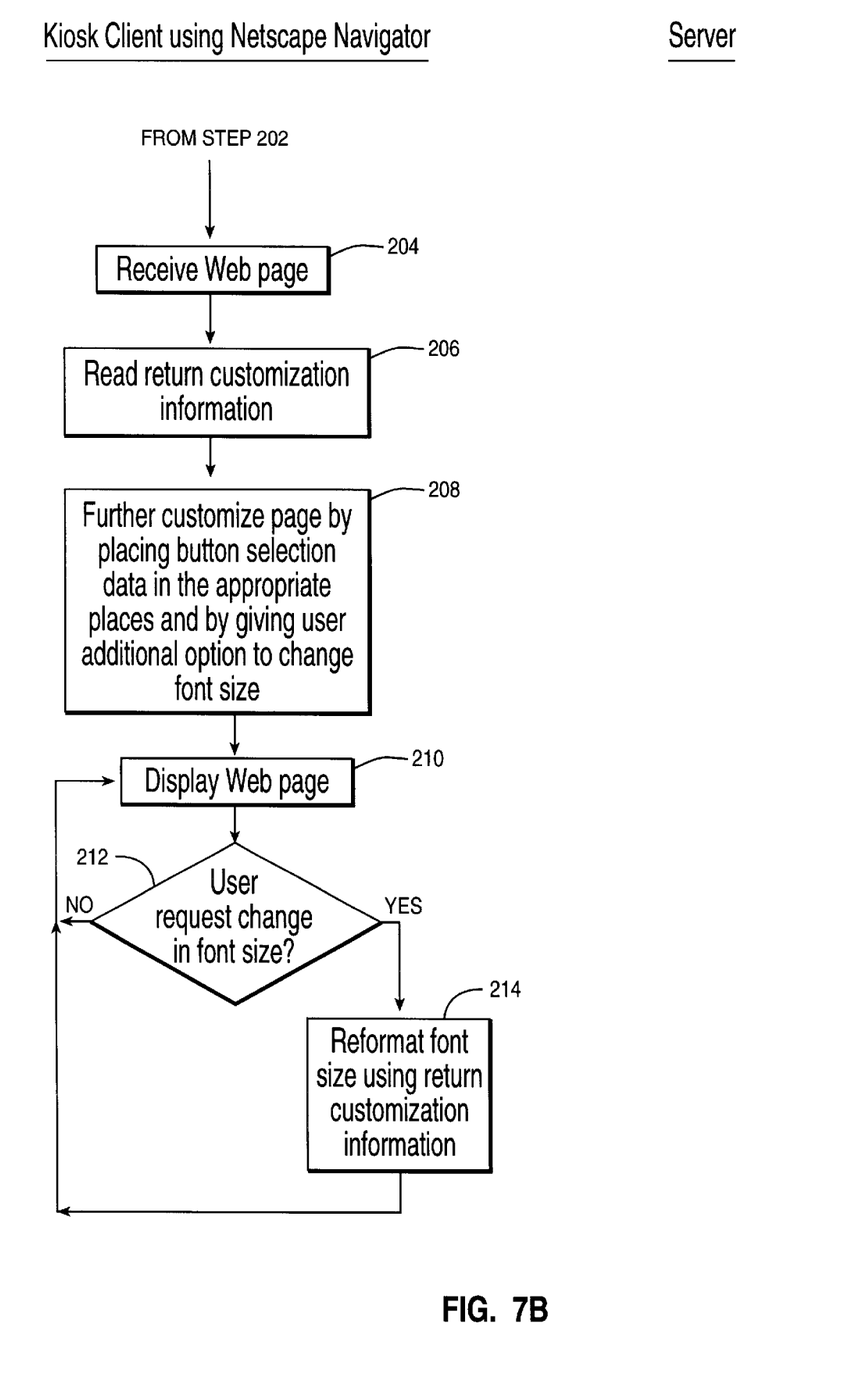

Referring now to FIGS. 7A and 7B, an example is shown where the client is a kiosk using the Netscape Navigator browser. In this example, a user of the kiosk pushes a button to indicate that he wishes to view all data in Spanish. Thus, a personal option is set by the client indicating that Spanish data should be obtained (step 180). The kiosk client sets corporate options indicating that it is a kiosk with user input buttons (step 182). The client then sends an HTTP request to the server requesting a particular Web page (step 184). The request includes the user agent string, corporate options, and personal options.

The server receives the request from the client (step 186), and reads the user agent string (step 188), and corporate and personal options (step 190). Based on the personal option set to "Spanish," the server obtains a Spanish version of the Web page (step 192). Note that if a Spanish version of the Web page did not exist, the server could obtain another version of the Web page and translate it to Spanish. Next, the server looks up the user agent string in its database (step 194), and performs any necessary customization to display the Web page using Netscape Navigator (step 196). Then, based on the corporate options, the server customizes the data for a kiosk with button selections (step 198). For example, the Web page will be formatted so that the user's choices are indicated by arrows pointing to buttons on the kiosk. The server then analyzes the Web page, and determines the return customization information to send to the client (step 200). In this example, the server returns information regarding the button selections, so that the client can further format the data for the particular physical locations of the buttons on the kiosk. The server also returns information regarding the font size of the text on the Web page. Information is returned that will allow the client to switch between several font sizes without having to re-request the Web page. The customized Web page, along with return customization information regarding the buttons and font size, is sent to the client (step 202).

The client receives the Web page (step 204), and reads the return customization information (step 206). The client uses the return customization information to further customize the Web page (step 208). The information regarding the buttons is used to place the button selection data and arrows next to the actual, physical buttons on the kiosk. The information regarding the font size is used to give the user an option to make the font size larger or smaller. The customized Web page is then displayed on the kiosk (step 210). If the user requests that the font size be changed (step 212), the Web page is re-formatted by the client using the return customization information from the server (step 214). The Web page is then displayed with the user-requested font size (step 210).

Figure 8:
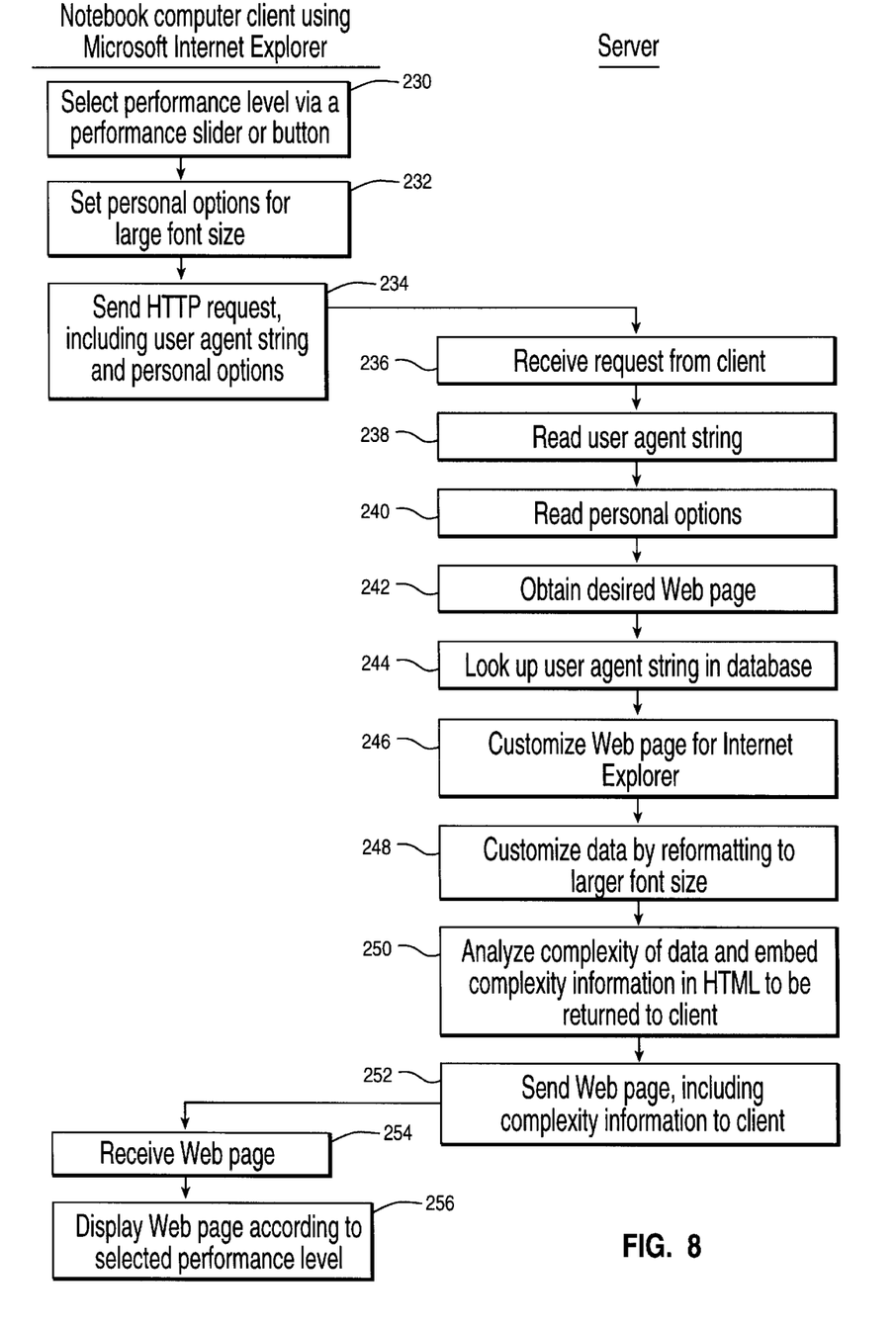
Figure 9:
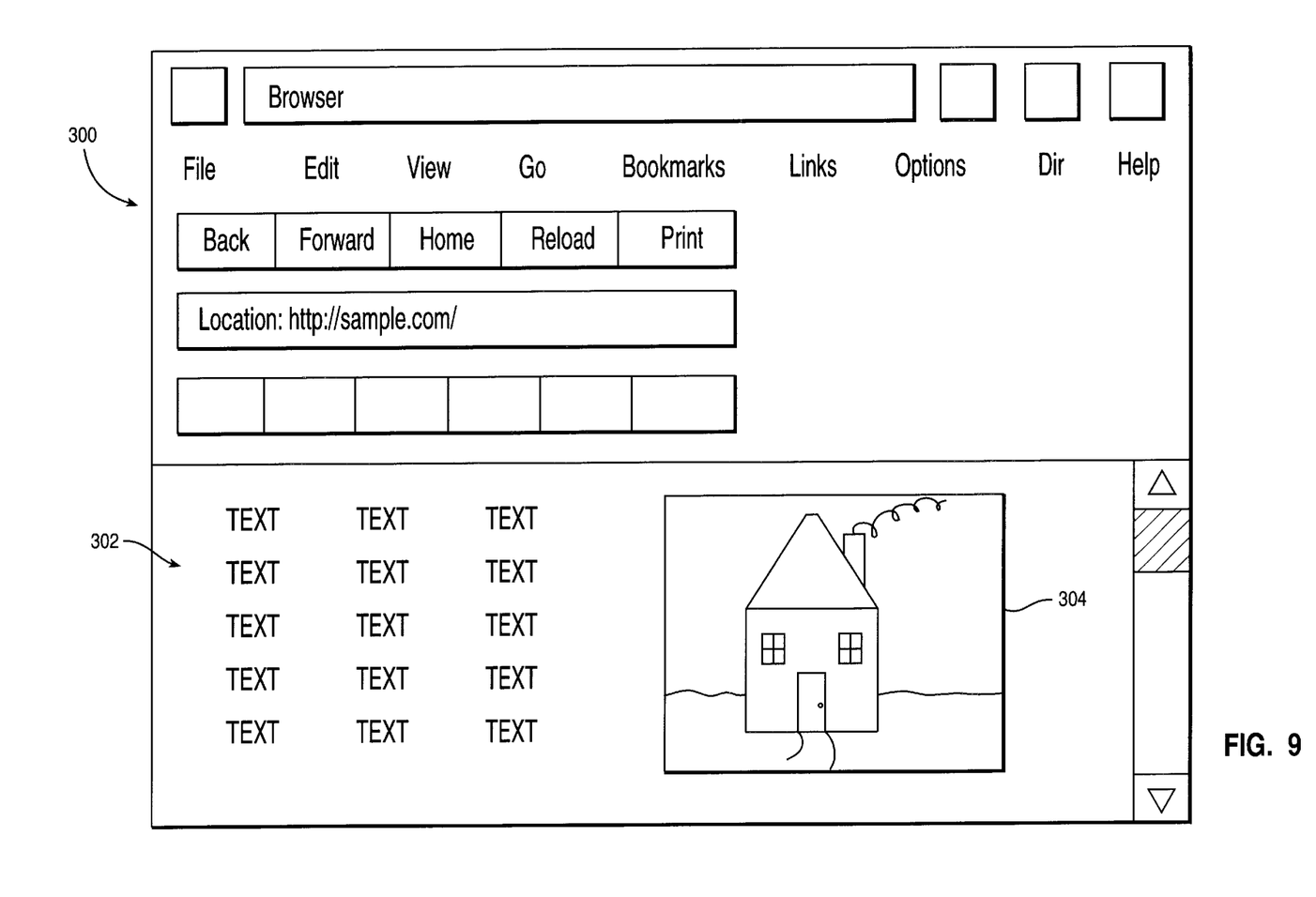
FIGS. 9, 10, and 11 are example Web pages that further illustrate the example shown in FIG. 8.

Referring now to FIG. 8, an example is shown where the client is a notebook computer using the Microsoft Internet Explorer browser. In this example, the client selects a desired performance level using a performance slider or button (step 230), and sets personal options for a larger font size (step 232). The client sends an HTTP request, including a user agent string and personal options, to the server requesting a particular Web page (step 234). The server receives the request from the client (step 236), and then reads the user agent string (step 238) and personal options (step 240). The server then obtains the desired Web page (step 242). If the desired Web page were to be displayed at this point, i.e. without any server-side or client-side customization, it would appear as shown in FIG. 9. Of course, the reader understands that the Web page is not actually displayed at this point. FIG. 9 is provided merely to illustrate the appearance of the Web page before any customization, either by the server or the client, is performed. As shown in FIG. 9, Web page 300 contains text 302 and graphics image 304.

Referring again to FIG. 8, the server next performs any necessary customization for Microsoft Internet Explorer (step 246). The server then customizes the Web page, according to the desired personal options, by increasing the font size of text 300 (step 248). The server then analyzes the complexity of the Web page content and embeds complexity data in the HTML file to be returned to the client (step 250). The customized Web page, including embedded complexity data, is then sent to the client (step 252).

Figure 10:
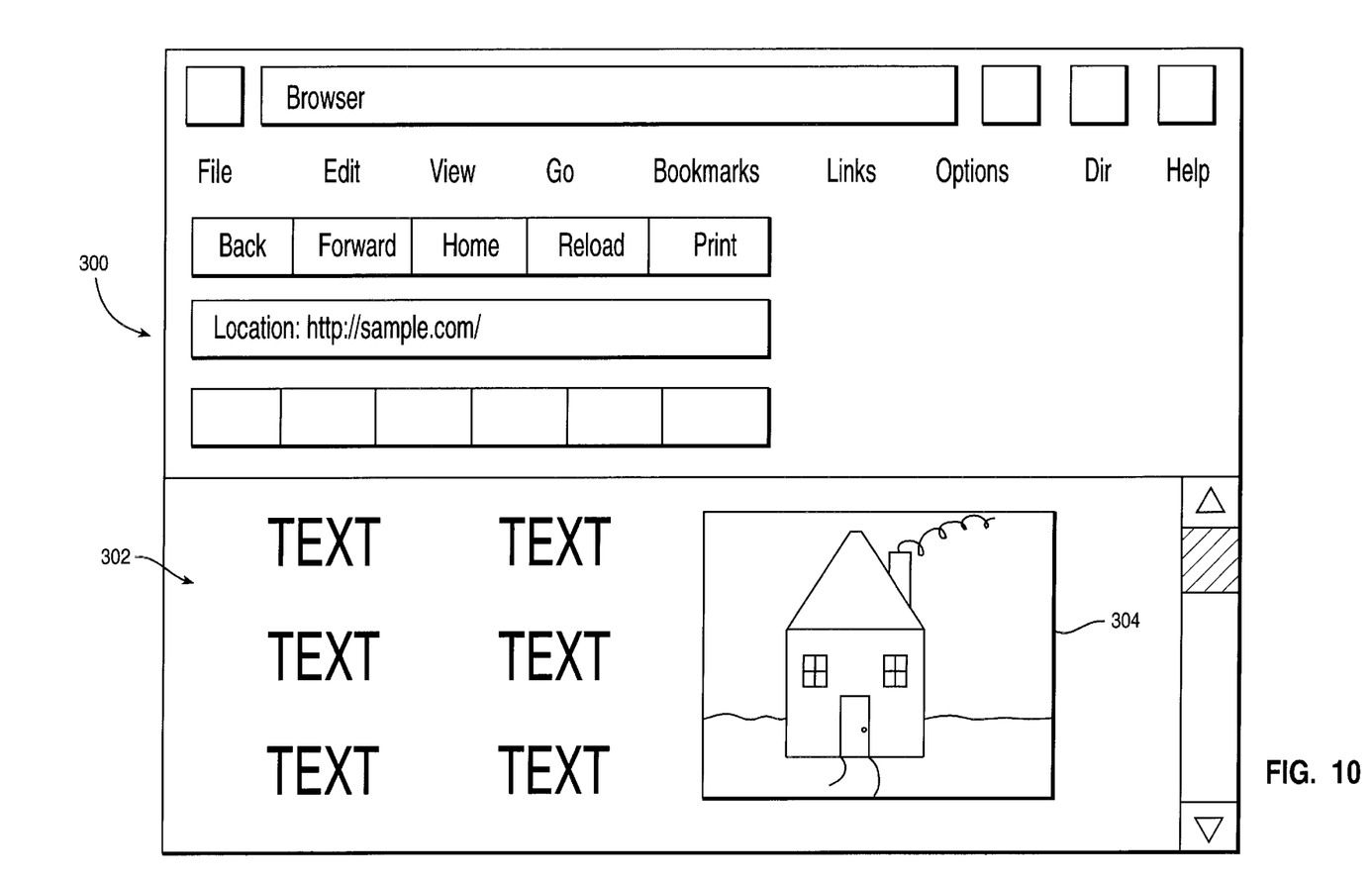

The client receives the Web page (step 254). If the Web page were to be displayed at this point, it would appear as shown in FIG. 10. Note that in FIG. 10, text 302 of Web page 300 is now shown with a larger font size. Graphics image 304 remains unchanged.

Figure 11:
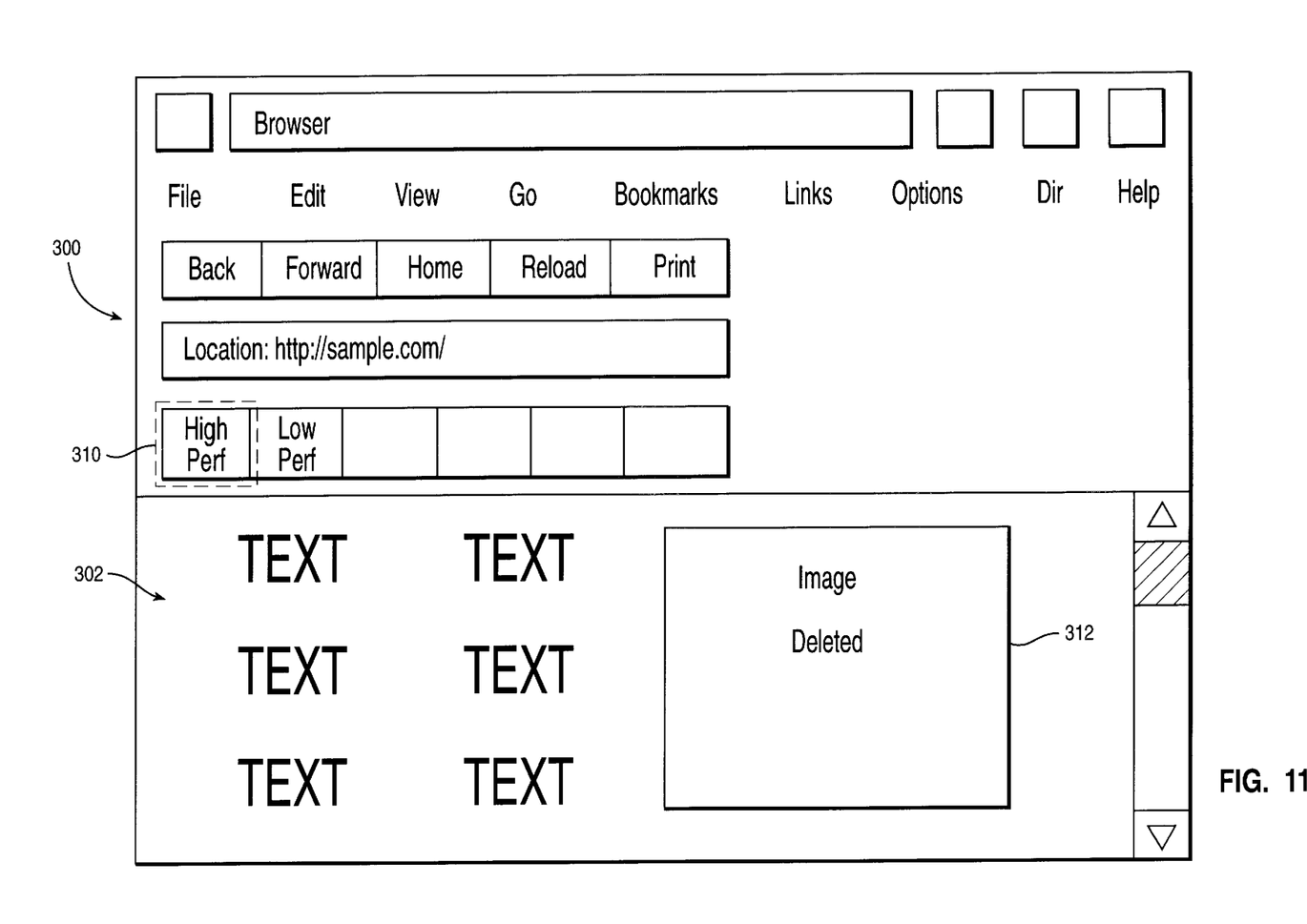

Referring back to FIG. 8, the client uses the embedded complexity data to customize and display the Web page according to a performance level selected by the user (step 256). As shown in FIG. 11, the user has selected a high performance level by selecting "High Perf" button 310. To obtain the high performance level desired by the user, the client removes graphics image 304 and replaces it with "image deleted" 312, as shown in FIG. 11. FIG. 11 shows the final version of the Web page, as it is displayed, after both server-side customization and client-side customization.

Figure 12:
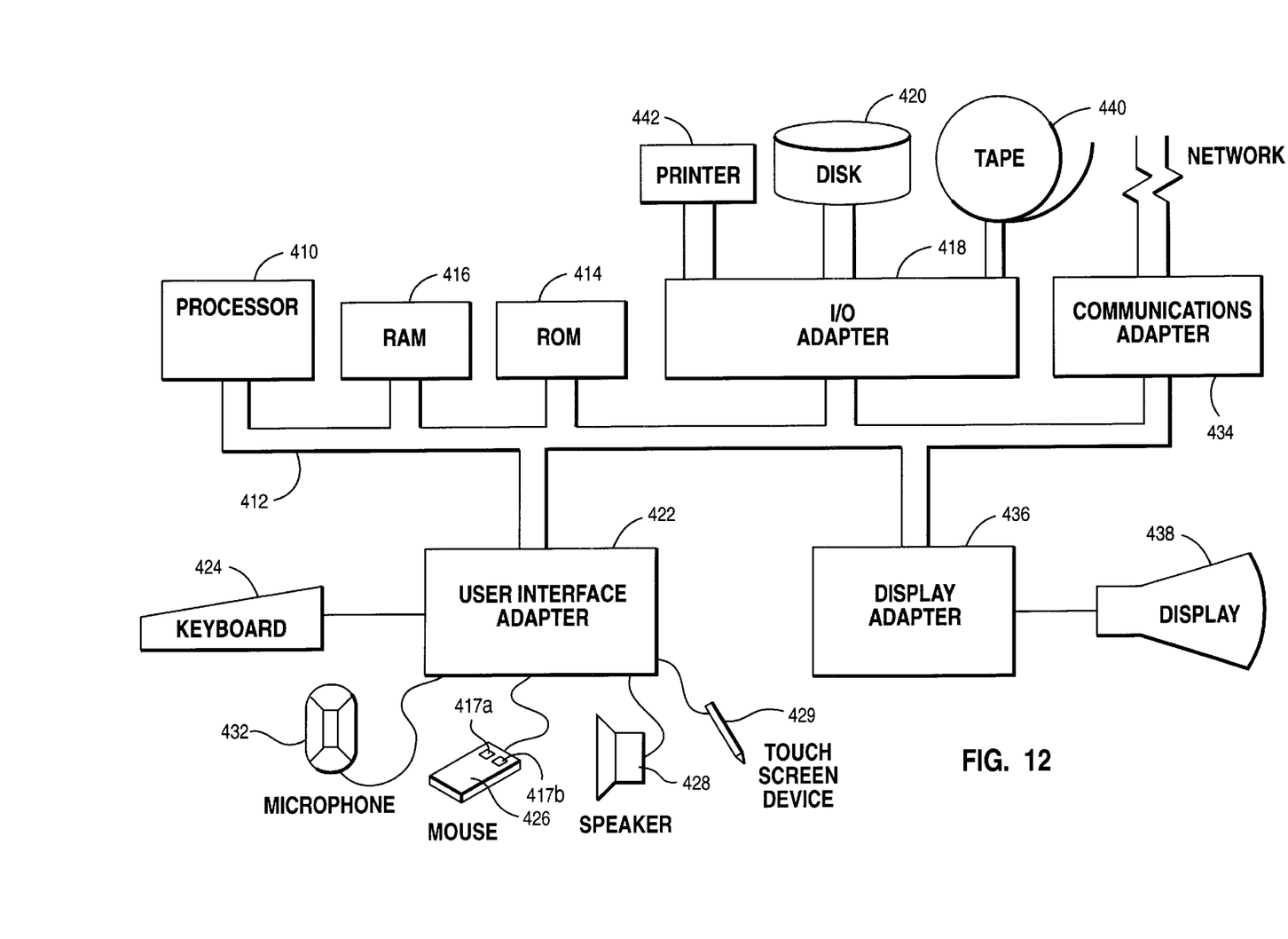
FIG. 12 is a block diagram of the major components of an information handling system unit on which the present invention may be practiced.

As discussed above, with reference to FIG. 2, both the client and the server may reside on a variety of information handling systems or collections of systems under a number of different operating systems. Referring now to FIG. 12, an exemplary information handling system will now be described. The computer system of FIG. 12 has at least one processor 410. Processor 410 is interconnected via system bus 412 to random access memory (RAM) 416, read only memory (ROM) 414, and input/output (I/O) adapter 418 for connecting peripheral devices such as disk units 420, tape drives 440, and printers 442 to bus 412, user interface adapter 422 for connecting keyboard 424, mouse 426 having buttons 417a and 417b, speaker 428, microphone 432, and/or other user interface devices such as a touch screen device 429, to bus 412, communications adapter 434 for connecting the information handling system to a data processing network, and display adapter 436 for connecting bus 412 to display device 438.

Communications adapter 434 may link the system depicted in FIG. 12 with hundreds or even thousands of similar systems, or other devices, such as remote printers, remote servers, or remote storage units. The system depicted in FIG. 12 may be linked to both local area networks (sometimes referred to as intranets) and wide area networks, such as the Internet.

Although the invention has been described with a certain degree of particularity, it should be recognized that elements thereof may be altered by persons skilled in the art without departing from the spirit and scope of the invention. One of the implementations of the invention is as sets of instructions resident in the random access memory of one or more computer systems configured generally as described in FIG. 12. Until required by the computer system, the set of instructions may be stored in another computer readable memory, for example in a hard disk drive, or in a removable memory such as an optical disk for eventual use in a CD-ROM drive, or a floppy disk for eventual use in a floppy disk drive. Further, the set of instructions can be stored in the memory of another computer and transmitted over a local area network or a wide area network, such as the Internet, when desired by the user. One skilled in the art will appreciate that the physical storage of the sets of instructions physically changes the medium upon which it is stored electrically, magnetically, or chemically so that the medium carries computer usable information. The invention is limited only by the following claims and their equivalents.

What is claimed is:

1. A method for customizing a file for a requesting client; comprising:

sending a file request, from the requesting client to a server, wherein the file request includes client device data and one or more-user specified viewing options;

at a server, performing a first set of adjustments to the file to produce a modified form of the file, wherein said performing includes modifying the file in accordance with the client device data and the user specified viewing options;

at the server, analyzing the file and determining return customization information;

sending the modified form of the file and the return customization information to the requesting client;

at the requesting client, performing a second set of adjustments to the modified form of the file to produce a final form of the file; and displaying the final form of the file on a display device.

2. A method according to claim 1, wherein said performing a first set of adjustments further comprises customizing the file for a class of devices to which the requesting client belongs.

3. A method according to claim 1, wherein said performing a second set of adjustments further comprises customizing the modified form of the file according to one or more user preferences at the requesting client.

4. A method according to claim 1, wherein said performing a second set of adjustments further comprises customizing the modified form of the file according to one or more current conditions at the requesting client.

5. A method according to claim 1, wherein said performing a second set of adjustments further comprises customizing the modified form of the file according to the return customization information.

6. A method according to claim 1, wherein said determining return customization information further comprises determining a complexity level of at least one element of the file.

7. A method according to claim 6, wherein said sending return customization information further comprises sending the determined complexity level, along with the modified form of the file, to the requesting client.

8. A method according to claim 7, wherein said performing a second set of adjustments to the modified form of the file further comprises displaying a selected element of the modified form of the file based on a corresponding complexity level associated with the selected element.

9. An information handling system, comprising:

a server;

a client, wherein said client sends a file request to said server, wherein said file request includes client device data and one or more user specified viewing options;

a display device connected to said client;

a network for connecting said server to said client;

means for performing a first set of adjustments to the file at said server, to produce a modified form of the file, wherein the first set of adjustments includes modifying the file in accordance with the client device data and the user specified viewing options;

means for analyzing the file at the server and determining return customization information;

means for sending the modified form of the file and the return customization information to said client;

means for performing a second set of adjustments to the modified form of the file at said client, to produce a final form of the file; and means for displaying the final form of the file on said display device.

10. An information handling system according to claim 9, wherein said means for performing a first set of adjustments further comprises means for customizing the file for a class of devices to which said client belongs.

11. An information handling system according to claim 9, wherein said means for performing a second set of adjustments further comprises means for customizing the modified form of the file according to one or more user preferences at said client.

12. An information handling system according to claim 9, wherein said means for performing a second set of adjustments further comprises means for customizing the modified form of the file according to one or more current conditions at said client.

13. An information handling system according to claim 9, wherein said means for performing a second set of adjustments further comprises means for customizing the modified form of the file according to the return customization information.

14. An information handling system according to claim 9, wherein said means for determining return customization information further comprises means for determining a complexity level of at least one element of the file.

15. An information handling system according to claim 14, wherein said means for sending return customization information further comprises means for sending the determined complexity level, along with the modified form of the file, to said client.

16. An information handling system according to claim 15, wherein said means for performing a second set of adjustments to the modified form of the file further comprises means for displaying a selected element of the modified form of the file based on a corresponding complexity level associated with the selected element.

17. A computer program product in computer-usable media for use in customizing a file for a requesting client, comprising:

means for sending a file request, from the requesting client to a server, wherein the file request includes client device data and one or more user specified viewing options;

means for performing a first set of adjustments to the file at a server, to produce a modified form of the file, wherein said performing includes modifying the file in accordance with the client device data and the user specified viewing options;

means for analyzing the file at the server and determining return customization information;

means for sending the modified form of the file and the return customization information to the requesting client;

means for performing a second set of adjustments to the modified form of the file at the client, to produce a final form of the file; and means for displaying the final form of the file on a display device.

18. A computer program product according to claim 17, wherein said means for performing a first set of adjustments further comprises means for customizing the file for a class of devices to which the requesting client belongs.

19. A computer program product according to claim 17, wherein said means for performing a second set of adjustments further comprises means for customizing the modified form of the file according to one or more user preferences at the requesting client.

20. A computer program product according to claim 17, wherein said means for performing a second set of adjustments further comprises means for customizing the modified form of the file according to one or more current conditions at the requesting client.

21. A computer program product according to claim 17, wherein said means for performing a second set of adjustments further comprises means for customizing the modified form of the file according to the return customization information.

22. A computer program product according to claim 17, wherein said means for determining return customization information further comprises means for determining a complexity level of at least one element of the file.

23. A computer program product according to claim 22, wherein said means for sending return customization information further comprises means for sending the determined complexity level, along with the modified form of the file, to the requesting client.

24. A computer program product according to claim 23, wherein said means for performing a second set of adjustments to the modified form of the file further comprises means for displaying a selected element of the modified form of the file based on a corresponding complexity level associated with the selected element.

* * * * *